United States Patent Office 2,743,972
Patented May 1, 1956

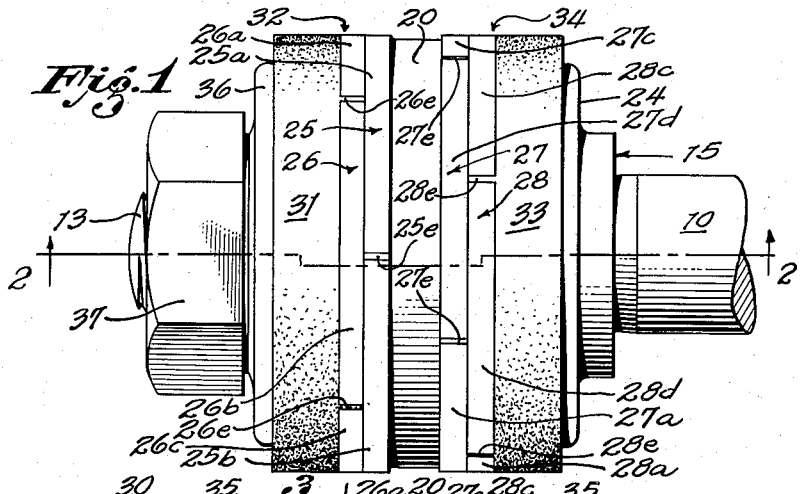
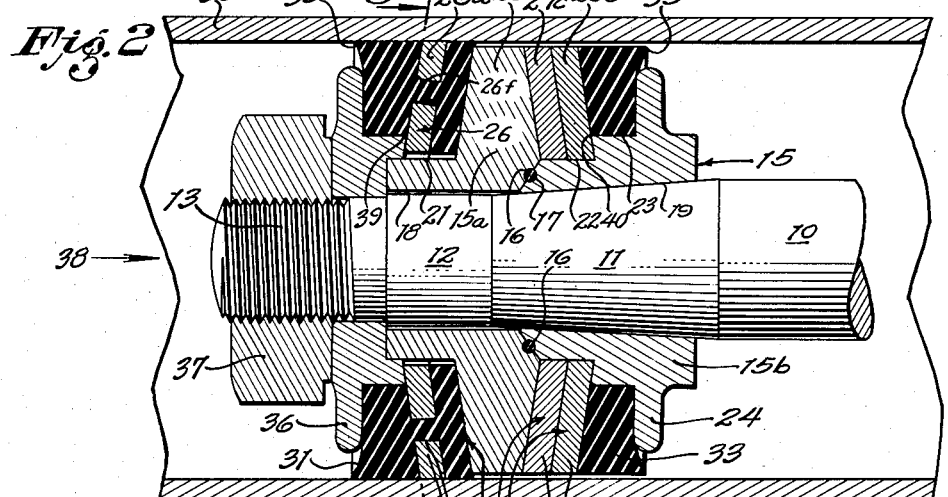
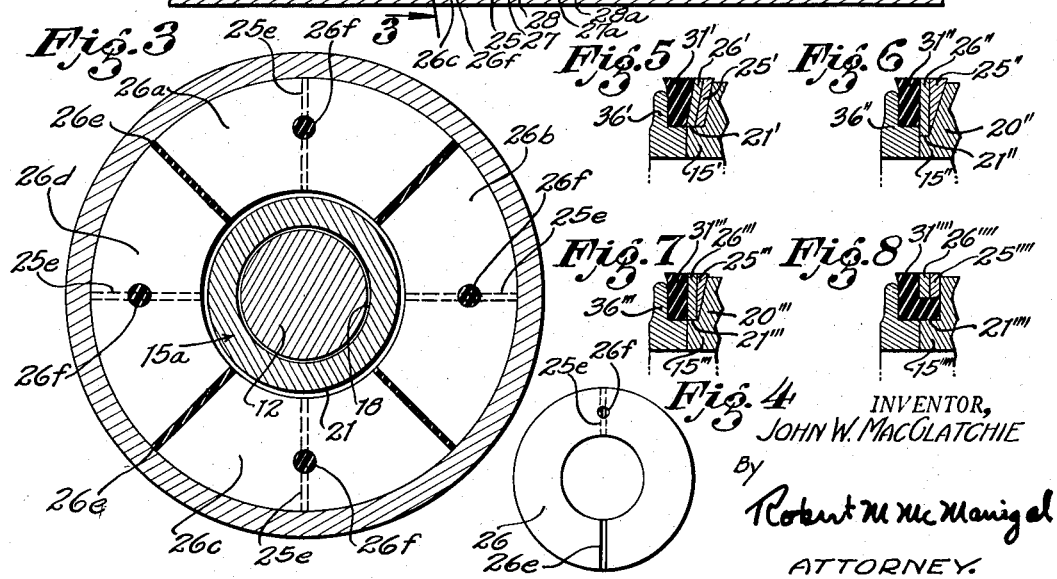
INVENTOR,
JOHN W. MacCLATCHIE
By Robert M. McManigal
ATTORNEY.

2,743,972

PISTON

John W. MacClatchie, Saugus, Calif.

Application January 26, 1952, Serial No. 268,414

9 Claims. (Cl. 309—23)

This invention relates to pistons, particularly pistons for use in mud pumps and adapted to be operated at high pressures.

One of the difficulties with pistons is that during the pressure stroke, portions of the piston are extruded between other portions of the piston and the pump liner, thereby damaging portions of the piston.

An object of my invention is to provide a pump piston in which no portion of the piston is extruded between any other portion of the piston and the pump liner.

Another object of my invention is to provide a pump piston, portions of which are adapted to be forced radially outward in order to fill the space between the periphery of said portions of the piston and the pump liner in order to prevent any other portion of the piston from being extruded between said first mentioned portion and the pump liner.

Another object of my invention is to provide a pump piston, a portion of which is either composed of a plurality of segments or split in at least one place in order to adapt said portion to be forced radially outward during the presure stroke to fill the space between said portion and the pump liner.

Another object of my invention is to provide a piston which is durable and capable of considerable use even though the fluid pumped is composed of sand, grit, gravel, cement, etc.

My invention has many other objects, advantages, and features, some of which, with the foregoing, will be set forth in the following description where I shall outline several forms of my invention, which I have selected for illustration in the drawings accompanying and forming a part of the present specification.

Referring to the drawings:

Fig. 1 is a side elevation of a piston embodying the invention;

Fig. 2 is a longitudinal section of the piston shown in Fig. 1, taken as indicated by the line 2—2 of Fig. 1 and including a pump liner;

Fig. 3 is a transverse section taken on the line 3—3 of Fig. 2;

Figs. 4, 5, 6, 7 and 8 are schematic illustrations of modifications of my invention.

Referring to the drawings, the numeral 10 designates a piston rod having a tapered end portion 11, a cylindrical portion 12 and a threaded portion 13.

The piston body 15 may be made of two parts, namely, 15a and 15b, each of which portion is provided with a groove at 16 in order to accommodate a sealing ring 17. The piston body 15 is provided with a cylindrical opening 18, a tapered opening 19, an annular tapered radially projecting abutment 20, cylindrical portions 21, 22 and 23, and an enlarged end portion 24.

The annular tapered radially projecting abutment 20 forms a backing plate for the members 25, 26, 27 and 28, and is of its largest diameter at its base.

During the pressure stroke in one direction the members 25 and 26 are adapted to be forced radially outward toward the pump liner 30 in order to fill the space between the periphery of said members and the pump liner 30. During the pressure stroke in the other direction the members 27 and 28 are adapted to be forced radially outward toward the pump liner 30 in order to fill the space between the periphery of said members and the pump liner 30. In order to adapt the members 25, 26, 27 and 28 for such radial movement, said members are composed of a plurality of segments or split in one or more places. In the form of my invention shown in Figs. 1, 2 and 3, each of said members is composed of 4 segments, 25a, 25b, 25c, 25d, 26a, 26b, 26c, 26d, 27a, 27b, 27c, 27d, and 28a, 28b, 28c and 28d, respectively.

As shown in Figs. 1 and 3, small spaces are provided at 25e, that is, between the abutting ends of the segments 25a and 25b, and 25b and 25c, and 25c and 25d and 25d and 25a. These spaces are at different positions than similar small spaces at 26e, that is, between the abutting ends of the segments 26a and 26b, 26b and 26c, 26c and 26d, and 26d and 26a.

As shown in Fig. 3, each of the segments 26a, 26b, 26c and 26d may be provided with holes 26f which are in line with one of the spaces 25e. In molding the packing element 31, the segments comprising the members 25 and 26 are placed in the mold and rubber is molded into the openings 26f and the spaces 25e, so that the members 25 and 26 and the packing elements 31 are molded into a single packing unit 32 to prevent any portion of the packing element 31 from being extruded into these spaces when the piston is in use, and to prevent any sand, grit, gravel or cement from being lodged in these spaces.

The segments of members 27 and 28 are similarly constructed and molded with the packing element 33 into a single packing unit 34.

The packing elements 31 and 33 may be made of neoprene or rubber and may be provided with sealing lips 35. The members 25, 26, 27 and 28 are made of harder material and preferably of material which is considerably less compressible or expandible than neoprene or rubber. They are also preferably made of material which is much harder than neoprene or rubber so that they can be slid both with respect to each other and with respect to the surfaces of the radial flange 20 and to prevent any extrusion of the packing element. The packing members 25 and 27 may be made of cast iron, bearing metal, or other suitable material.

One manner in which the piston may be assembled is as follows. The piston body part 15b is mounted on the piston rod. The unit 34 is then mounted on the cylindrical portions 22 and 23 of the piston body part 15b. With a sealing ring 17 in position in one of the grooves 16, the piston body part 15a is then mounted on the piston rod 10. The unit 32 is then mounted on the cylindrical portion 21. An end plate 36 is then mounted on the outer portion of the cylindrical portion 12 of the piston rod 10, after which a nut 37 is threaded onto the threaded portion 13 of the piston rod 10 in order to tighten the piston and securely hold it in position.

During the pressure stroke in the direction indicated by the arrow 38, members 25 and 26 are forced radially outward into the position shown on the left hand side in Fig. 2. The members 25 and 26 fill the area between the said members and the adjacent portions of the liner 30 of the pump so that no part of the packing element 31 can be forced into any part of this area. Fluid seals are also effected at 39, and 40, that is, at the inner edges of the packing elements 31 and 33. Even though the outer peripheries of the members 25, 26, 27 and 28 become worn, said members during the pressure stroke are forced radially outward against the liner 30, and fluid seals are still effected at 39 and 40 and said members can become considerably worn before any rubber of the packing elements 31 and 33 can be forced radially inwardly of the members 25, 26, 27 and 28.

Although I have shown each of the members 25, 26, 27 and 28 composed of four segments, each of said members may be composed of two, three, five, six or any other desired number of segments, depending upon the size of the piston and other factors.

Although I prefer to make the members 25, 26, 27 and 28 so that they are formed of a plurality of segments, each of said members may be formed of a single member which is split at only one place. An instance of this modification is shown in Fig. 4 which is similar to the form of my invention shown in Figs. 1, 2 and 3, except that each of the members 25, 26, 27 and 28 is split at only one place, with the splits in the adjacent members in disalignment.

The modification of my invention shown in Fig. 5 is similar to the form of my invention shown in Figs. 1, 2 and 3, except that the members 25' and 26' and the corresponding elements on the other side of the radial flange 20' are not positioned in recessed portions of the piston body 15'. In other words, said members 25' and 26' are of the same height as the packing elements 31'. The cylindrical portion 21' of the piston body 15' and the corresponding cylindrical portion on the other side of the radial flange 20' are of greater diameter than the cylindrical portions 21 and 22 of the piston body 15, and are of the same diameter as the inner cylindrical portion of the end plate 36'.

The modification of my invention shown in Fig. 6 is similar to the form of my invention shown in Figs. 1, 2 and 3, except that the member 25" and the corresponding member on the other side of the radial flange 20" are wedge-shaped in form, and the member 26" and the corresponding member on the other side of the radial flange 20" are not inclined from the vertical. The wedge-shaped members 25" may be constructed of the same material as the members 26 and 26" or other suitable material, such as cast iron bearing metal, etc.

The modification of my invention shown in Fig. 7 is similar to the form of my invention shown in Fig. 6, except that members 25''' and 26''' and the corresponding members on the other side of the radial flange 20''' are not positioned in recessed portions of the piston body 15'''. In other words, said members 25''' and 26''' are of the same height as the packing elements 31'''. The cylindrical portion 21''' of the piston body 15''' and the corresponding portion of the piston body on the other side of the radial flange 20''' are of greater diameter than the cylindrical portions 21 and 22 of the piston body 15, and are of the same diameter as the inner cylindrical portion of the end plate 36'''.

The modification of my invention shown in Fig. 8 is similar to the form of my invention shown in Figs. 1, 2 and 3, except as follows. The sides of the radial flange 20'''' of the piston body 15 are not inclined from the vertical. The cylindrical portion 21'''' of the piston body 15'''' and the corresponding cylindrical portion on the other side of the radial flange 20'''' are of larger diameter than the cylindrical portions 21 and 22 of the piston body 15 and are of the same diameter as the inner cylindrical portion of the end plate 36''''. The packing element 31'''' and the corresponding packing element on the other side of the flange 20'''' are wider than the packing elements 31 and 33 and each of said packing elements 31'''' and its corresponding packing element is provided with an annular peripheral groove at its inner end. The members 25'''' and 26'''' and the corresponding members on the other side of the radial flange 20'''' are not inclined from the vertical and are smaller in height.

Each of the members 25', 25", 25''', 25'''', 26', 26", 26''', 26'''' and their corresponding members on the other side of the radial flange is composed of a plurality of segments or is split in at least one place.

From the description set forth in connection with the form of my invention shown in Figs. 1, 2 and 3, the remainder of the construction and the operation of the forms of my invention shown in Figs. 4, 5, 6, 7 and 8 will be readily understood by those skilled in the art to which the invention appertains and therefore will not be repeated herein.

While I have described six embodiments of my invention, I desire to have it understood that the forms shown are merely illustrative and that the invention is not to be limited to the details disclosed herein, but is to be accorded the full scope of the appended claims.

I claim:

1. In a pump piston: a hub having a radial flange intermediate the ends thereof; annular members mounted on said hub with said flange forming a backing element for said annular members, and a resilient packing element mounted on said hub in mutually contacting relation with one of said annular members, each of said annular members being split in at least one place so that it is adapted to be forced radially outward when pressure is applied to the packing element, the split in each of said annular members being in disalignment with respect to the split in the next adjacent annular member, the annular member adjacent said resilient packing element being provided with a hole adjacent the split in the next adjacent annular member, and a portion of said resilient packing element filling the splits in said annular members.

2. In a pump piston: a hub having a radial tapered flange intermediate the ends thereof providing a frusto-conical bearing surface; annular members mounted on said hub with said frusto-conical bearing surface on said flange forming a backing element for said annular members, and a resilient packing element mounted on said hub in mutually contacting relation with one of said annular members, said annular members being composed of material harder than the material comprising said packing element, each of said annular members being split in at least one place so that it is adapted to be forced radially outward and longitudinally when pressure is applied to the packing element, the split in each of said annular members being in disalignment with respect to the split in the next adjacent annular member, the annular member adjacent said resilient packing element being provided with a hole adjacent the split in the next adjacent annular member, and a portion of said resilient packing element filling the splits in said annular members.

3. In a pump piston: a hub having a radial flange intermediate the ends thereof; an annular member mounted on said hub with said flange forming a backing element for said annular member; and a resilient packing element mounted on said hub in mutually contacting relation with said annular member, said annular member being composed of material harder than the material comprising said packing element, said annular member being composed of a plurality of individual segments which are adapted to be forced radially outward when pressure is applied to the resilient packing element, the abutting ends of said segments comprising one of said annular members being at positions different than the abutting ends of said segments comprising the next adjacent annular member, the annular member adjacent said resilient packing element being provided with holes adjacent the abutting ends of said segments comprising the next adjacent annular member, and a portion of said resilient packing element filling the spaces between the abutting ends of said annular members.

4. In a pump piston: a hub having a radial flange intermediate the ends thereof; annular members mounted on said hub with said flange forming a backing element for said annular members, each of said annular members being split in at least one place so as to be capable of radial expansion; a resilient packing element mounted on said hub in juxtaposition with said annular members, said resilient packing element and said annular members being formed into an integral packing unit with the splits in adjacent members being in disalignment with respect to one another, the annular member adjacent said resilient packing element being provided with a hole adjacent the split in the next adjacent annular member, and a portion of said resilient packing element filling the splits in said annular members.

5. In a pump piston: a hub having a tapered radial flange intermediate the ends thereof, the widest portion of said flange being at its base portion to provide an outwardly facing frusto-conical bearing surface; annular members mounted on said hub with said frusto-conical bearing surface on said flange forming a backing element for said annular members; and a resilient packing element mounted on said hub in mutually contacting relation with said annular member, said annular members being composed of material harder than the material comprising said packing element, said annular members being composed of a plurality of individual segments which are adapted to be forced radially outward when pressure is applied to the resilient packing element, the abutting ends of said segments comprising one of said annular members being at positions different than the abutting ends of said segments comprising the next adjacent annular member, the abutting ends of said segments comprising one of said annular members being at positions different than the abutting ends of said segments comprising the next adjacent annular member, the annular member adjacent said resilient packing element being provided with holes adjacent the abutting ends of said segments comprising the next adjacent annular member, and a portion of said resilient packing element filling the spaces between the abutting ends of said annular members.

6. In a pump piston: a hub having a tapered radial flange intermediate the ends thereof, the widest portion of said flange being at its base portion to provide an outwardly facing frusto-conical bearing surface; annular members mounted on said hub with said frusto-conical bearing surface on said flange forming a backing element for said annular members; and a resilient packing element mounted on said hub in mutually contacting relation with said annular member, said annular members being composed of material harder than the material comprising said packing element, said annular members being composed of a plurality of individual segments which are adapted to be forced radially outward when pressure is applied to the resilient packing element, the abutting ends of said segments comprising one of said annular members being at positions different than the abutting ends of said segments comprising the next adjacent annular members, the annular member adjacent said resilient packing element being provided with holes in line with the abutting ends of the next adjacent annular members, and said annular members being molded to said packing element as an integral packing unit.

7. In a pump piston: a hub having a tapered radial flange intermediate the ends thereof, the widest portion of said flange being at its base portion to provide an outwardly facing frusto-conical bearing surface; annular members mounted on said hub with said frusto-conical bearing surface on said flange forming a backing element for said annular members; and a resilient packing element mounted on said hub in mutually contacting relation with one of said annular members, said annular members being composed of material harder than the material comprising said packing element, said annular members being composed of a plurality of individual segments, the abutting ends of said segments comprising one of said annular members being at positions different than the abutting ends of said segments comprising the next adjacent annular member, the annular member adjacent said resilient packing element being provided with holes adjacent the abutting ends of said segments comprising the next adjacent annular member, and a portion of said resilient packing element filling the spaces between the abutting ends of said annular members.

8. In a pump piston: a hub having a radial tapered flange intermediate the ends thereof; an annular wedge-shaped member mounted on said hub with said flange forming a backing element for said annular wedge-shaped member; an annular disc mounted on said hub and a resilient packing element mounted on said hub, said annular wedge-shaped member and said annular disc being composed of material harder than the material comprising said packing element, said wedge-shaped member and said annular disc being each split in at least one place so that said members are adapted to be forced radially outward when pressure is applied to the packing element, the splits in said wedge-shaped member being at positions different than the splits in said annular disc, said disc being provided with a hole adjacent the split in the wedge-shaped member, and a portion of said resilient packing element filling the splits in said wedge-shaped member.

9. In a pump piston: a hub having a radial flange intermediate the ends thereof; a resilient packing element mounted on said hub, said resilient packing element having an annular peripheral groove at its inner end, annular discs mounted in said peripheral groove, said radial flange forming a backing element for said resilient packing element and said annular discs, said annular discs being composed of material harder than the material comprising said packing element, and said annular discs being each split in at least one place so that said members are adapted to be forced radially outward when pressure is applied to the packing element, the splits in one of said annular discs being at positions different than the splits in the other of said annular discs, the annular disc adjacent said resilient packing element being provided with holes adjacent the splits in the other of said annular discs, and a portion of said resilient packing element filling the spaces between the splits of said annular discs.

References Cited in the file of this patent

UNITED STATES PATENTS

| | | |
|---|---|---|
| 1,097,563 | Sowden | May 19, 1914 |
| 1,612,039 | Miller | Dec. 28, 1926 |
| 1,949,612 | Mattair | Mar. 6, 1934 |
| 2,298,584 | Onions | Oct. 13, 1942 |
| 2,349,170 | Jackman | May 16, 1944 |
| 2,383,959 | Dick | Sept. 4, 1945 |
| 2,402,268 | Young | June 18, 1946 |
| 2,679,441 | Stillwagon | May 25, 1954 |

FOREIGN PATENTS

| | | |
|---|---|---|
| 551,507 | Great Britain | Feb. 25, 1943 |